Patented Aug. 16, 1932

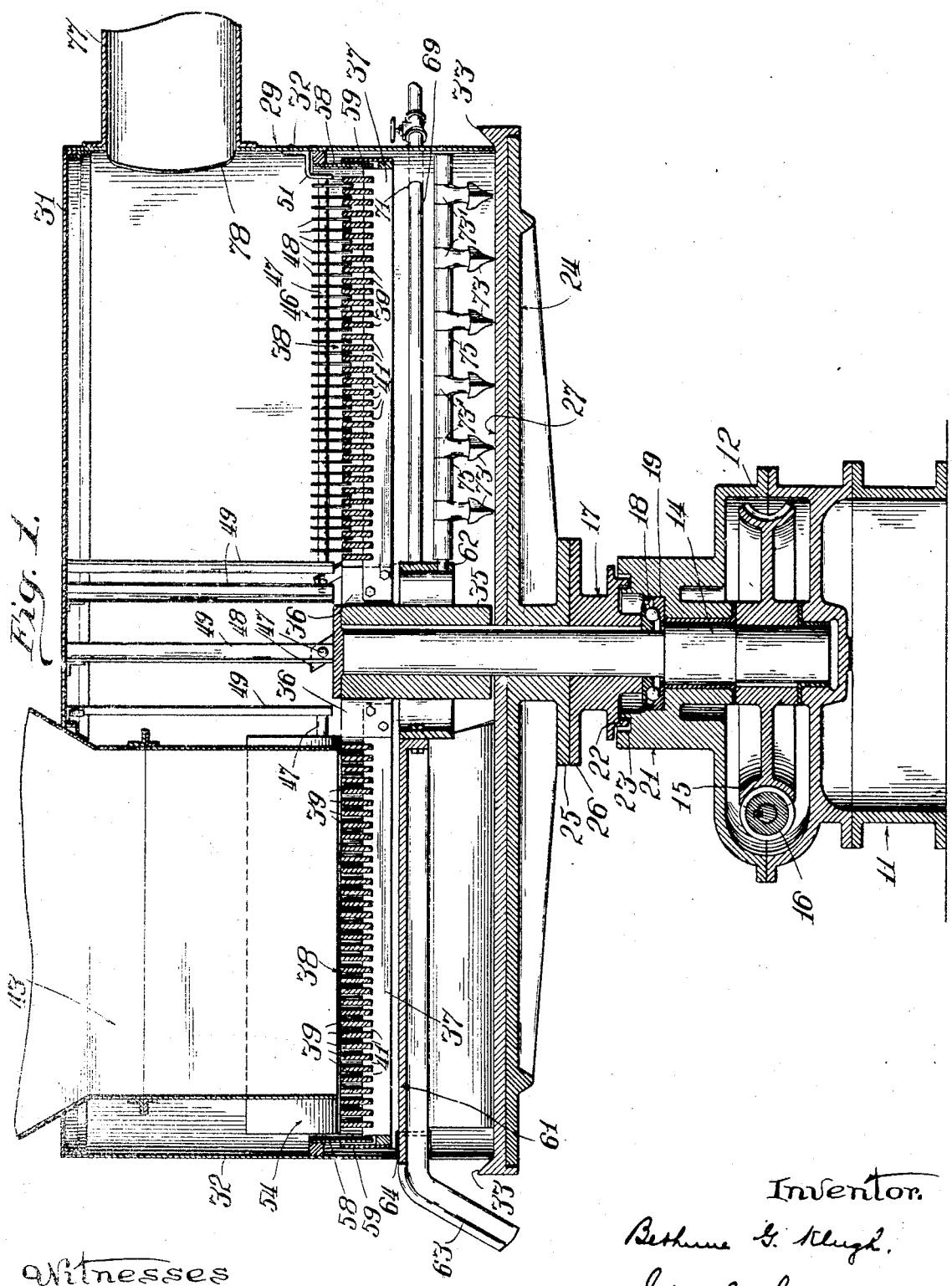

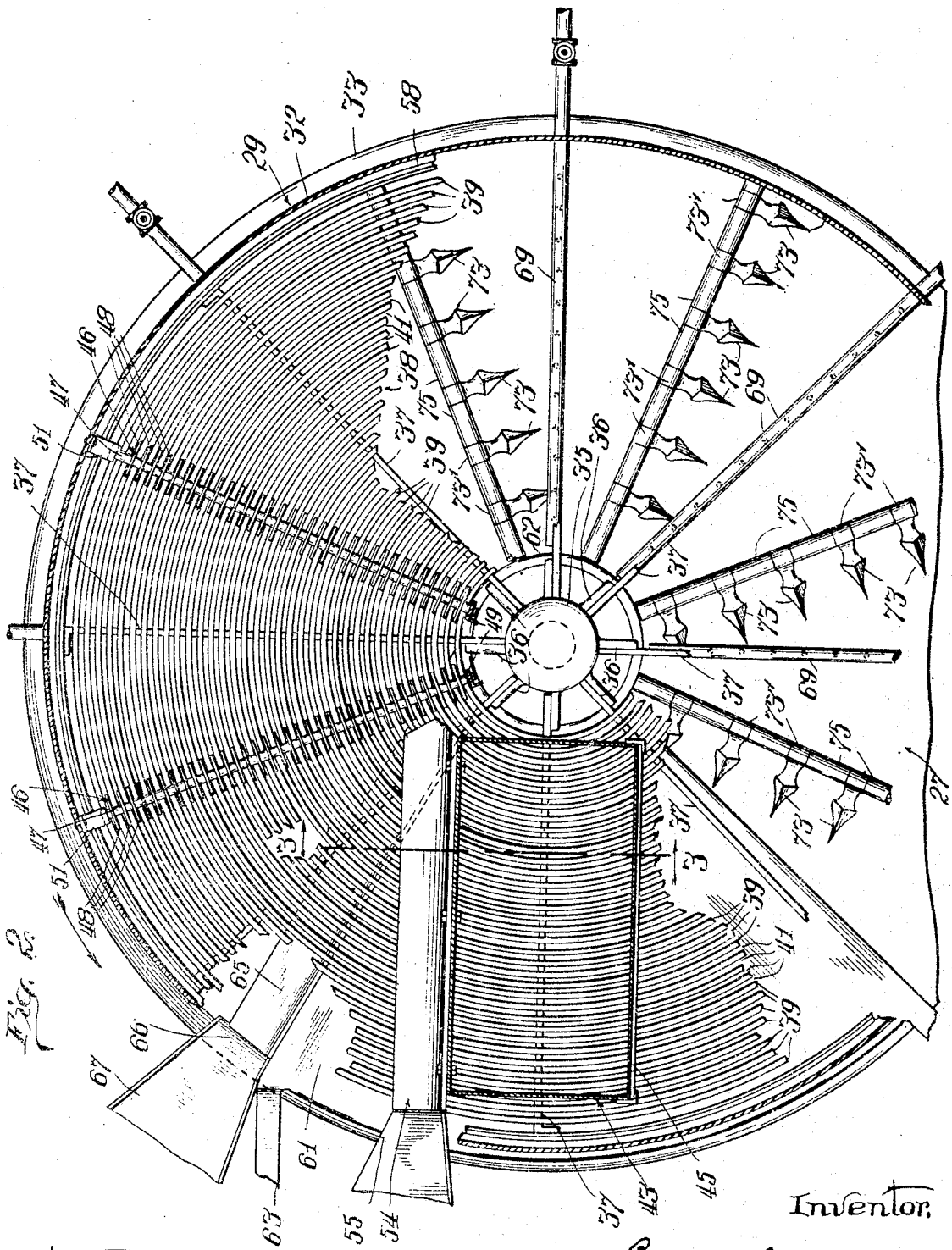

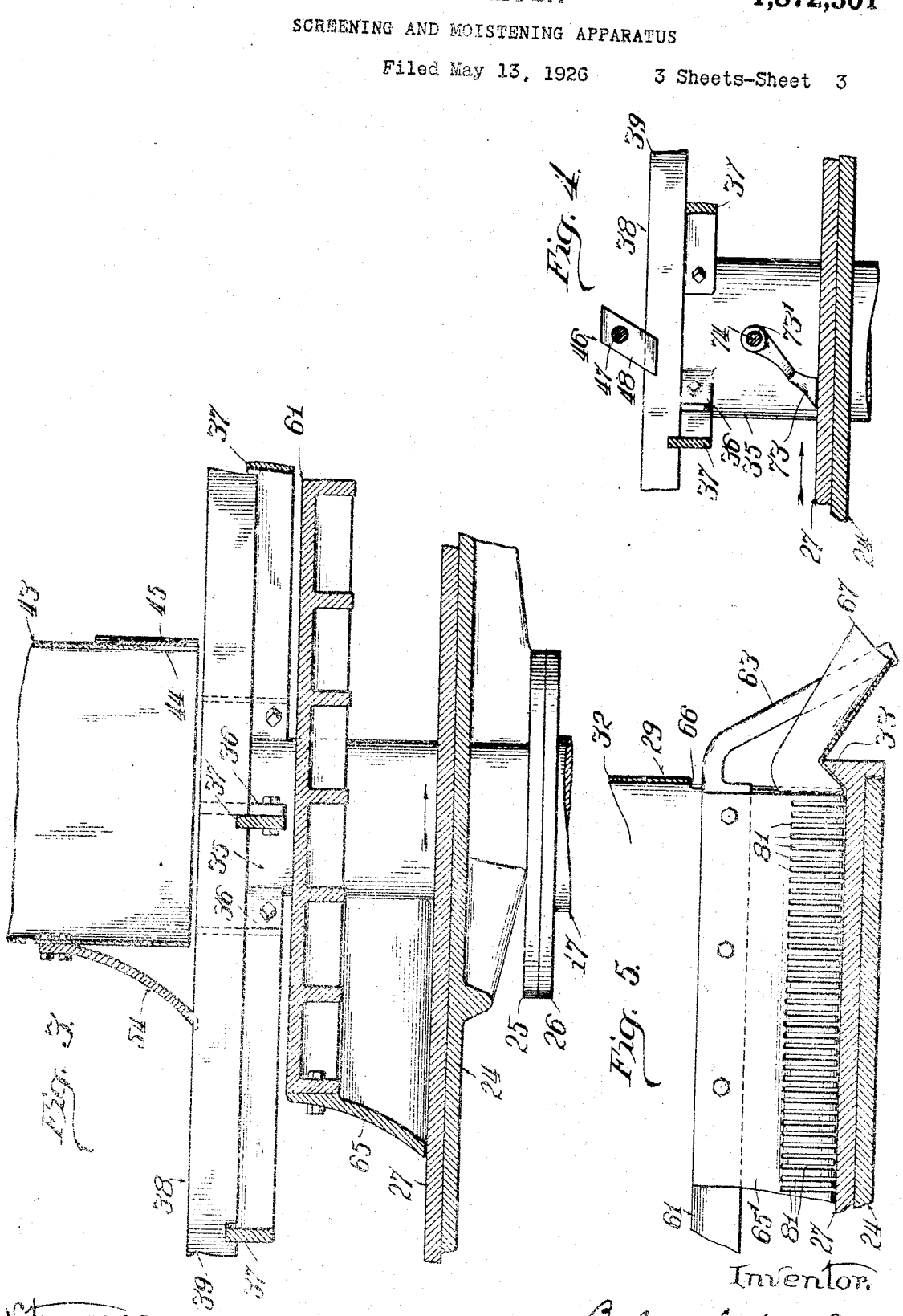

1,872,301

UNITED STATES PATENT OFFICE

BETHUNE G. KLUGH, OF CHICAGO, ILLINOIS, ASSIGNOR TO AMERICAN ORE RECLAMATION COMPANY, OF NEW YORK, N. Y., A CORPORATION OF NEW YORK

SCREENING AND MOISTENING APPARATUS

Application filed May 13, 1926. Serial No. 108,716.

The present invention relates to improved apparatus for screening and moistening mixtures of fine and coarse material. The invention is particularly adapted to the treatment of blast furnace flue dust, but is equally adaptable to the treatment of other materials of like character requiring this treatment or like treatment. Certain features of the present invention, pertaining to the screening function, have application to other types of apparatus where only a screening operation is desired; and likewise, certain features of the invention pertaining to the moistening function have application to other types of apparatus where only a moistening or wetting function is desired. Because of its intended utility for the treatment of blast furnace flue dust, I shall describe the invention in this embodiment, the other adaptations thereof being obvious from this construction.

Blast furnace flue dust is usually taken from the dust collecting equipment in a hot state. It is composed of extremely fine ore dust that is carried over by the gases, but usually contains in addition thereto considerable coke and other solid material of varying size and in varying proportion to the relatively fine dust. The handling of this material generally involves considerable difficulty due to the ability of such material to flow through very small apertures, and also due to its tendency to create dust clouds whenever it is set in motion thus endangering workmen and causing damage to adjacent machinery through abrasion. In reclamation work, now extensively practiced with blast furnace by-products, it is quite customary to treat this flue dust in such manner as to render it suitable for blast furnace recharging. Such treatment consists in agglomerating the dust by various methods or processes, such as by sintering, as is well known. Preparatory to sintering the dust, it is desirable or necessary to separate the coarser material from the fine material. The coarser material, usually consisting of coke, is useful for reuse in the blast furnace, provided that a fairly clean separation of the fine dust from this coarser material can be made. It is one of the objects of the present invention to provide apparatus which will perform this screening function and obtain a thorough, clean separation of the fine dust from the coarser material.

It is a further object of the invention to provide safe and effective means for moistening the fine, dry dust, and for cooling it simultaneously with such moistening, in order that it may be handled through subsequent steps of the operation, without its throwing out dust clouds into the surrounding atmosphere. This moistening of the anhydrous dust is usually quite difficult. The dust actually repels water, and it is necessary that the water be added in graduated quantities, with sufficient stirring or mixing to uniformly distribute the water throughout the entire body of dust being handled. While it is necessary that the dust be moistened sufficiently so that it will not throw out dust clouds into the atmosphere, nevertheless the dust should not be moistened to the point where it will tend to stick to chutes, conveyors, or bin walls through which it is handled, but will flow freely during these subsequent handling operations. The moistening of hot dust in large masses is fraught with considerable danger when a portion of the dust is made quite wet and masses of hot, dry dust are superposed thereon. Under such conditions, steam is quickly generated causing actual explosions, which throw out large masses of the hot, dry dust, with consequent danger of injury to the workmen. The present apparatus is so designed that this moistening operation is carried on with the dust maintained in a relatively thin stratum, and with no possibility of superposing any large quantity of the dust upon the dust already moistened.

The separation of the flue dust from the coarser material accompanying it is more efficiently and completely performed while the entire aggregate is in the dry state. Conversely, the moistening of the fine dust is more effectively performed after its separation from the coarser material than when mixed therewith. It is one of the objects of the present invention to provide improved apparatus which will first perform this screening function and thereafter perform the function of moistening the separated fine dust.

It is desirable that the flue dust be handled directly from the source to avoid cost of stocking and rehandling, and in the majority of cases apparatus of this type will therefore receive the dust in a hot or dry state, as above described. However, in many instances, it is often necessary to stock this flue dust. At such times, the flue dust is generally subjected to weather conditions, sometimes over considerable periods, and in consequence the dust assumes characteristics, in so far as its handling is considered, quite different from that of the hot, dry dust above described, but presenting equally difficult problems for its treatment. This dust when so subjected, becomes somewhat plastic and tends to cohere to the coarse coke and other materials admixed therewith. This renders its screening extremely difficult. It is quite essential in installations for flue dust treatment that the apparatus be capable of handling flue dust in either the hot, dry state, or in the latter state resulting from stocking and it is one of the objects of the invention to provide apparatus which will handle this dust material of both characteristics.

The presence of the flue dust entails considerable abrasion and wear on bearings and other moving parts adjacent thereto, and accordingly it is a further object of the invention to provide apparatus of this type characterized by a minimum number of working parts exposed to such deleterious action of the flue dust.

Referring to the accompanying drawings wherein I have illustrated a preferred embodiment of my invention:

Figure 1 is a vertical sectional view through the apparatus taken on a plane passing through the inlet chute.

Fig. 2 is a horizontal sectional view through the apparatus taken on a plane above the screening bars, a portion of these bars being broken away to illustrate the plows and spray pipes.

Fig. 3 is a sectional view through the inlet chute and adjacent parts of the apparatus, being taken approximately on the plane of the line 3—3 of Fig. 2.

Fig. 4 is a detail sectional view through the apparatus, corresponding to a tangential section, and Fig. 5 is a front elevational view illustrating a modified form of flue dust scraper.

The apparatus is supported on a central base casting 11 of any suitable form, to the upper side of which is bolted a split gear housing 12 containing the gear mechanism for transmitting the rotation to the rotatable elements of the device. This rotation is transmitted through a vertical shaft 14 to the lower portion of which is keyed a worm wheel 15 within the gear housing 12. A worm 16 meshes with this worm wheel, being driven from any suitable source of power, and driving the shaft 14 at the desired speed, most effective for the screening and moistening operations to be described. A collar 17 is mounted on the shaft 14 above the gear housing, this collar comprising a depending portion which bears against the upper race of a thrust bearing 18 contained in an annular recess 19 formed in the extending boss portion 21 of the gear housing. A depending flange 22 is formed on the underside of the collar 17 and rotates within an annular groove or recess 23 formed in the top of the boss 21. This groove or recess 23 may contain oil or other liquid to thereby form a liquid seal for preventing the entrance of flue dust to the thrust bearing 18 and adjacent radial bearings above and below the worm wheel 15.

The collar 17 is keyed to the shaft 14 and rotates therewith, and mounted on the shaft above this collar is a disk 24 which is also keyed to the shaft to be driven thereby. This disk 24 has a flanged hub 25 which bears on a flange 26 at the upper end of the collar 17, the underside of this disk being suitably ribbed for reinforcement, as desired. Mounted on this disk 24 is an upper disk 27 which rotates with the lower disk, the two in effect forming a rotating table surface on which the fine flue dust is alternately mixed and moistened. A casing 29 is supported in stationary position above this rotating table surface 27, this casing being preferably of cylindrical form and comprising a top wall 31 and a cylindrical side wall 32. The lower edge of this cylindrical side wall is supported adjacent to or in approximate contact with the table surface 27. A tapering flange 33 is formed around the outer periphery of the table disk 27, this flange sloping upwardly from the lower edge of the casing 29 and operating to reduce or avoid leakage of flue dust from between the stationary casing and the rotating disk.

The shaft 14 extends above the table surface 27, and rigidly keyed to this extending portion is a hub 35. Projecting substantially radially from the upper end of this hub are a plurality of equidistantly spaced lugs 36 to each of which is bolted a radially extending bar 37. These bars 37 support a screening disk on which the screening operation is performed, this screening disk being designated 38 in its entirety. The screening disk consists of a series of equally spaced rings 39 of vertical bar section, the radially extending bars 37 forming an open fan-like frame on which these spaced rings 38 are supported. The rings are preferably set in spaced notches cut in the upper edges of the radial bars. The resulting structure is a rotating screening disk having continuous annular slots 41 formed in its upper surface. The rings 39 are so spaced that the widths of these slots 41 will permit the fine flue dust to fall through the disk down upon the rotating table surface 27, but will sustain the coarser materials which are to be separated from this fine dust. The rings 39 are of relatively narrow width so that there will be practically no tendency for the fine dust to remain on the upper surfaces of these bars. Any dust remaining on these upper surfaces will be dislodged for precipitation through the slots 41 by the oversize scraper (to be hereinafter described), or will shake off these surfaces in the continued rotation of the screening disk. Preferably, this screening disk is of flat form as shown, but it might be of tapering cross section with the taper sloping either downwardly or upwardly relative to the center of the disk.

The flue dust, and such other materials as may be contained therein, is fed to the device through an inlet chute or hopper 43 which extends down through the top wall 31 of the casing 29. The lower edge of this hopper is disposed in close proximity to the upper surface of the annular screen bars 39, except on one side of the hopper (corresponding to the trailing side of the hopper with respect to the direction of rotation of the screen bars), Figure 3, where there is provided a feed opening 44 regulated by a controllable gate 45. This gate is slidably mounted in any suitable manner relative to the opening 44, and is actuated by any suitable operating means. With a given setting of this gate, the material will be fed to the device at a relatively constant rate, dependent upon the rate of speed of rotation of the screening disk 38. The opening of the gate 45 should be sufficient at all times to pass the coarser materials.

The material which does not immediately fall through the slots 41 of the screening disk is carried around on the upper surface of this disk and is subjected to successive agitating operations, which loosen the material and shake the flue dust from the larger particles in order that the flue dust will be precipitated through the screen. This repeated agitation is effected by a series of comb members 46 disposed at equidistantly spaced points above the screening disk and comprising comb-like teeth which engage in the slots 41 of the screening disk. These comb members are mounted in stationary position, preferably radially of the screening disk, and all the material remaining on the upper surface of the screening disk encounters these comb structures at successive points in the rotation of the disk, which comb structures raise such material from the surface of the screening disk and from the slots 41, as well as shaking up the material for loosening the flue dust therefrom. Each comb member comprises a radially extending bar 47 on which are rigidly mounted small plates 48 so positioned as to engage in the grooves 41 of the screening disk. These plates are set at an angle sloping forwardly with respect to the direction of rotation of the screening disk, so that the material supported on the disk or lodged in the slots 41, will be carried upwardly along the sloping front surfaces of these plates 48 and dropped off the rear edges thereof. This operation of repeatedly lifting the coarser material from the surface of the screening disk and then dropping it back upon the disk effectively loosens such material and shakes off all particles of flue dust tending to adhere thereto. The lower edges of these teeth like plates 48 are cut horizontally and extend in close proximity to the upper surface of the radial supporting bars 37.

The inner end of each comb bar 47 is supported in a depending angle bar 49 which extends downwardly from the top wall 31 of the casing 29. The outer end of each comb bar 47 is supported in an angle bracket 51 which is secured to the side wall 32 of the casing. Each of these comb bars is rigidly held in the mounting brackets 49 and 51, and the tooth members 48 are rigidly secured to this bar so that they will not be deflected from their angular position by the material engaging their front edges. Each tooth member 48 may be keyed to the bar 47, or spacers may be interposed between adjacent tooth members along the rod 47, and the entire series of tooth members and spacers rigidly clamped together by nuts screwed over the ends of the rods. As shown in Figure 2, there are preferably a considerable number of these comb members 46 disposed at different points around the path of travel of the screening disk for repeatedly subjecting the coarser material to this agitating operation.

The coarses materials which are not finally precipitated through the screening disk are carried around to an oversize scraper 54 along the side of the inlet hopper opposite to that side having the feeding opening 44. As shown in Figure 3, this oversize scraper preferably consists of a curved plate bolted to the adjacent wall of the feeding hopper and having its lower edge in approximate contact with the upper surfaces of the screening bars 39. As the coarser materials engage such scraper they will be worked outwardly along the scraper through the rotation of the screening disk until they are discharged from the outer end thereof through an opening 55 in the side wall of the casing. This opening can be arranged to discharge into any suitable chute or receptacle disposed below the opening.

To prevent any possibility of the coarser materials falling between the outer periphery of the screening disk and the side wall of the casing, down onto the rotating table surface 27, there is provided a continuous circular ring 58 which is fixedly secured to the side wall of the casing, in spaced relation thereto, and which overlaps, or is disposed on the inner side of a cooperating continuous ring 59 carried on the outer ends of the radial supporting bars 37. These cooperating rings 58 and 59 effectively prevent any of the oversize material from falling between the outer periphery of the disk and the casing, down onto the rotating table surface 27, but it will be observed that these rings have no contacting surfaces which would be subject to abrasion from the flue dust. Extremely dry flue dust has great mobility under pressure, flowing almost like water, and it is therefore necessary or desirable to provide some means below the inlet hopper 43 for preventing such dry flue dust from falling through the screening surface at an excessive rate and virtually flooding the lower table surface 27 on which the moistening operation is performed. To this end, I dispose what I term a dead plate 61 beneath the radial supporting bars 37 and directly below the hopper 43. As shown in Figure 3, this dead plate extends laterally beyond the side planes of the hopper in each direction, and also extends from the inner periphery of the screening surface to the outer periphery thereof. It will be noted that the hopper also extends across approximately the entire width of the screening disk. The inner end of such dead plate is bolted to a stationary annulus 62 surrounding the hub 35, and the outer edge of the dead plate may be provided with downwardly inclined supporting bars 63 which pass out through an opening 64 in the side wall of the casing and have stationary mounting at any suitable point below the machine. Bolted to the front edge of the dead plate 61 is a scraper 65 (Figure 3), which scrapes the fine flue dust and all undersize material from the surface of the moistening disk 27, and ejects such material out through an opening 66 in the side wall of the casing for discharge into a chute 67. As shown in Figure 2, the front edge of the dead plate 61 lies on a chord with reference to the circular form of the machine, and the scraper 65 also lies on this chord, whereby the rotary motion of the disk 27 will tend to feed the material accumulating against the scraper 65 progressively towards the discharge opening 66 and chute 67. It will be observed that the dead plate 61 is made sufficiently wide so that three of the radial supporting arms 37 are always extending across its upper surface. By this arrangement, these radial supporting bars function as gates for preventing the descending dust from overflowing the lateral edges of the dead plate. As the fine dust accumulates on the dead plate it is wiped off of such plate by each succeeding arm 37 so that it is precipitated down upon the moistening disk 27 at a predetermined regular rate.

The material precipitated on this lower moistening disk is subjected to successive moistening and mixing operations performed at different points on the rotation of the disk around to the point of discharge at the scraper 65. The moistening of such material is effected by projecting sprays of water down upon the material from a plurality of radially extending spray pipes 69 having spray apertures along the bottoms thereof. As shown in Figure 2, there is preferably provided a considerable number of these spray pipes, all spaced equidistantly around the machine and entering through holes 71 in the side wall of the casing. The inner ends of these spray pipes have any suitable mounting in the stationary annulus 62. A master valve may be employed for controlling the supply of water to all of the spray pipes, or individual valves 72 may be provided in each pipe for controlling the rate of water discharge over the area sprayed by that particular pipe.

Concurrently with the spraying of the fine material, it is subjected to successive mixing operations performed by radially extending rows of plows 73. Each row of plows is mounted on a radially extending shaft 74 supported at the outer end in the side wall of the casing and at the inner end in a hole in the stationary annulus 62. Spacing sleeves 75 are preferably interposed between the hub portions 73' of these plows to maintain the plows in definite spacing. As shown in Figure 4, these plows extend forwardly from their mounting shafts 74 with respect to the direction of rotation of the disk 27, so that the weight of each plow and the reaction set up by its engagement with the material operate to hold the plow down against the surface of the disk 27. These plows form furrows in the material conveyed by the disk, splitting the material to each side of the plow. As shown in Figure 2, the plows in one radial row are offset or staggered with respect to the plows in preceding and succeeding rows so that as each row of plows forms a series of furrows in the material, the next row of plows will split the hills between these furrows, thus producing a constant turning over and mixing of the material during the moistening process. A row of plows is preferably interposed between each pair of sprinkling pipes 69, so that as the surface of the material is moistened by the water discharged from one pipe, this moistened surface will be turned over by the plows immediately following to present a fresh surface to the moistening water from the next pipe.

To vent any pressures created within the casing 31, an outlet flue 77 extends from an opening 78 in the upper part of the casing wall 32, above the screening disk 38.

In the operation of the device the gate 45 will be given a setting proportionate to the desired rate of feed of the material to the screening disk 38. The relatively fine dust which is free of the coarser material will be precipitated immediately upon the dead plate 61 where it will be wiped off by the radial supporting arms 37 for precipitation down on to the moistening disk 27. The coarser materials remaining on the upper side of the screening disk 38 will be brought successively into engagement with the rows of comb members 46 which will lift such coarser material from the surface of the screening disk and then drop it back upon said disk. This operation of repeatedly lifting the coarser material and then dropping it back upon the screening disk has the very desirable action of loosening fine particles of dust from the coarser material for precipitation down upon the moistening disk 27. Eventually the coarser material which cannot pass through the screening disk, or which is not broken up to sufficient fineness for precipitation through the disk, encounters the scraper 54 and is ejected outwardly through the opening 55 and into the chute or receptable associated with such opening. The fine material collecting on the moistening disk 27 is subjected to repeated moistening and plowing operations which effectively admix the water with such material. When this moistened material encounters the lower scraper 65 it is likewise ejected from the machine through the opening 66 and chute 67. Because of the comparatively thin stratum of material being subjected to this moistening operation and because of the fact that no additional material of any considerable volume is precipitated on such moistened material, there is no possibility of steam pockets being created in the material with the likelihood of explosions. The steam which is generated rises through the material up into the upper part of the casing where it is vented through the outlet flue 77. The complete enclosure afforded by the casing 29 precludes any of the dust passing out into the surrounding atmosphere. If desired, flexible curtains or hoods may be placed over the outlet openings 55 and 66, or the respective chutes for such openings may be joined in a dust-tight connection therewith. The relatively large size of the outlet flue 77 precludes the vented steam from assuming any considerable velocity, which might tend to carry suspended dust out with the steam.

In Figure 5 I have illustrated a modified form of scraper 65' for ejecting the fine material subsequent to its being moistened. The scraper 65 hereinbefore described is of solid construction but in this modified embodiment a series of closely spaced slots 81 are formed in the scraper which performs a selecting operation between the moistened material and the dry material. This slotted construction utilizes the agglomerating characteristics of moistened dust to perform such selecting operation. The agglomerated form that moistened dust tends to assume enables it to bridge over narrow openings and hence this moistened dust will not pass through the slots 81, at least with the facility of the dry dust, and hence this moistened dust will be worked out gradually along the surface of the scraper to the discharge opening 66. The dry dust, on the other hand, will pass through these slots 81 quite readily and thus this dry dust will be subjected to a second moistening and mixing operation, or any repeated number of these operations until the dust is properly moistened.

The present apparatus is also useful for thawing frozen aggregates of fine material. In this practice, the material is fed into the hopper in the same manner as with normal materials, whereupon the fine materials will pass through the spaces between the screen bars 39 and the frozen lumps of material will remain bridged on the upper sides of the screen bars. At this time the pipes 69 will be arranged to discharge steam or any other hot gas, or they may be supplied with a combustible gas so that they will function as burners. The frozen lumps carried on the upper screening surface will thus have their undersides exposed to the direct action of the heating fluid from below, and will disintegrate into finer materials and drop through the screening disk down upon the table surface 27. For this use of the device, the oversize scraper 54 may be removed, and the hopper 43 may be elevated slightly so as to permit continued rotation of the frozen material on the upper surface of the screening bars.

When materials are to be treated that require screening only, the supply of water through the pipe 69 may be interrupted, whereupon the apparatus will function to perform the screening operation in the manner hereinbefore described. In the event that two classifications of the oversize material are desired, an additional screening disk may be provided above the disk 38 having a greater spacing between the screen bars, such upper screening surface also having a scraper associated therewith for ejecting the larger oversize materials therefrom.

What I claim as my invention and desire to secure by Letters Patent is—

1. In combination, a rotating screening disk having circular slots therein, a feed hopper discharging on to said screening disk at one point, stationary means for discharging the material carried on said screening disk at another point, and teeth extending into the slots of said screening disk intermediate the points of feed and discharge, whereby the material is fed to the disk, carried along by it, agitated by the teeth and the residue picked up from the disk and discharged.

2. In combination, means providing a moving screening surface, a feed hopper discharging material to said surface, means below said screening surface adapted to receive material capable of passing therethrough, a secondary surface below said screening surface and extending through only a part of a circle which is alined with the outlet end of said hopper, and means moving across said secondary surface and discharging the material therefrom.

3. In combination, a rotating screening disk, a feed hopper discharging material on to said disk, means providing a surface extending through a sector of a circle disposed below said screening disk and alined substantially with and adjacent to the outlet end of said hopper whereby to restrict the velocity of flow from the latter, and means moving with said screening disk and having a wiping motion across said latter surface for discharging the material therefrom.

4. In combination, a rotating screening disk, a lower disk receiving the material precipitated through said screening disk, a feed hopper discharging on to said screening disk, and a dead plate disposed between said disks and substantially alined with said hopper.

5. In combination, a rotating screening disk, a lower disk receiving the material precipitated through said screening disk, a feed hopper discharging on to said screening disk, a dead plate disposed between said disks and substantially alined with said hopper, and means moving with said disks for wiping across the surface of said dead plate and discharging material tending to accumulate thereon.

6. In combination, a rotating screening disk, a lower disk receiving the material precipitated through said screening disk, a feed hopper discharging on to said screening disk, a dead plate disposed between said disks and substantially aligned with said hopper and members rotating with said disks and passing across the upper surface of said dead plate for forming moving pockets in conjunction with said dead plate.

7. A device for separating fine material from coarser material comprising a slotted screening element and a toothed element the teeth of which extend into the slots and which have inclined front faces and substantially vertical rear faces and means for producing relative movement between the screening element and the toothed element to cause the material to go up the inclined faces of the teeth, over them and down to jar the fine material loose from the coarse material.

8. A device for treating mixtures of fine and coarse materials comprising a rotating screen, a hopper provided with means for spreading a layer of the mixture on the screen, stationary means for picking up and dropping the material to shake the fine material loose from the coarse, meas for removing the coarse material from the screen, a table below the screen and hopper where the greater amount of fine material which passes through the hopper is deposited, a rotating plate below the screen and table and rotating arms arranged to sweep the table and deposit the fine material in a substantially uniform layer on the plate and means for treating the fine material located between the plate and screen.

9. A device for treating mixtures of fine and coarse materials comprising a rotating screen, a hopper provided with means for spreading a layer of the mixture on the screen, means for agitating the mixture to assist in separating the material, stationary means below the screen for receiving the fine material, a rotary plate below the receiving means, means for taking the material from the receiving means and distributing it over the plate and means above the plate for treating the fine material.

BETHUNE G. KLUGH.